United States Patent [19]
Fowler et al.

[11] 3,737,757
[45] June 5, 1973

[54] PARASITIC SUPPRESSING CIRCUIT

[75] Inventors: John T. Fowler, Winthrop; Frank L. Raposa, Concord, both of Mass.

[73] Assignee: The United States of America as represented by the Administrator of the National Aeronautics and Space Administration, Washington, D.C.

[22] Filed: May 15, 1972

[21] Appl. No.: 253,405

[52] U.S. Cl.............321/11, 317/DIG. 6, 321/45 C
[51] Int. Cl..............................................H02m 1/18
[58] Field of Search.................317/DIG. 6; 321/11, 321/12, 13, 45 C

[56] References Cited
UNITED STATES PATENTS 3,614,531  10/1971  Oswald............................317/DIG. 6
3,189,796  6/1965  Tipton.............................317/DIG. 6
3,560,820  2/1971  Unnewehr........................321/45 C
3,643,129  2/1972  Marsh.............................317/DIG. 6

Primary Examiner—William M. Shoop, Jr.
Attorney—N. T. Musial, J. A. Mackin and John R. Manning

[57] ABSTRACT

A circuit for suppressing parasitic oscillations across an inductor operating in a resonant mode is described. The circuit includes a switch means and resistive means connected serially across the inductor. A unidirectional resistive-capacitive network is also connected across the inductor and to the switch means to automatically render the switch means conducting when inductive current through the inductor ceases to flow.

9 Claims, 2 Drawing Figures

PATENTED JUN 5 1973 3,737,757

PARASITIC SUPPRESSING CIRCUIT

ORIGIN OF THE INVENTION

The invention described herein was made by employees of the United States Government and may be manufactured or used for governmental purposes by or for The Government of the United States of America, without the payment of any royalties thereon or therefor.

BACKGROUND OF THE INVENTION

The invention relates to circuitry for damping parasitic oscillations and is directed more particularly to circuitry for selectively damping parasitic oscillations appearing across resonating inductors of the type used in high power inverters.

Some high power inverters used for converting DC power to alternating current utilize a resonating inductor which may be magnetically coupled to a secondary winding connected to a load. The resonating inductor is connected serially with a capacitor, a DC source and a switch. The switch is turned on and off at a predetermined rate to supply current for one half cycle of operation to the inductor which resonates with the capacitor each time the switch opens. This provides alternating current output to the load. At the end of each resonant half cycle, parasitic oscillations may occur and may damage or destroy solid state devices such as the switch which is usually a silicon controlled rectifier or the like.

In the past, parasitic oscillations have been damped by connecting a resistor and capacitor in series across the inductor which is generating the parasitic oscillations. Such a damping circuit has several disadvantages. First, the damping is always present across the inductor and will seriously degrade its Q. Additionally, in order to critically damp the parasitic oscillations, relatively low values of resistance and high values of capacitance must be used. This will result in unreasonably high power consumption and low efficiency for high power inverter circuits.

OBJECTS AND SUMMARY OF THE INVENTION

It is an object of the invention to provide for the inductor of a resonant type inductor inverter, a parasitic oscillation suppressor which has substantially no effect on the power inductor Q when current is being supplied to the inductor from the DC source and which has negligible effect on the inductor Q during the resonant half cycle when the current through the inductor is collapsing.

It is another object of the invention to provide apparatus for critically damping ringing oscillations which occur after the resonant half cycle of a power inductor of the type utilized in a resonant inductor type DC to AC inverter.

Still another object of the invention is to provide a parasitic oscillation suppressor circuit which requires no external control circuit to activate it.

Yet another object of the invention is to provide a parasitic oscillation suppressor circuit for a resonant inductor inverter which circuit does not draw a significant amount of power from the power inductor.

An additional object of the invention is to provide a parasitic oscillation suppressor circuit which is passive until the end of each resonant inductor cycle, that is, when the self-induced voltage across the inductor drops to approximately zero.

In summary, the invention provides for a resonant inductor, a parasitic oscillation suppressor circuit which causes substantially no degradation of the inductor 2, which requires no external control circuitry to activate it and which is passive until the end of each resonant half cycle.

DESCRIPTION OF A PREFERRED EMBODIMENT

Figure 1:
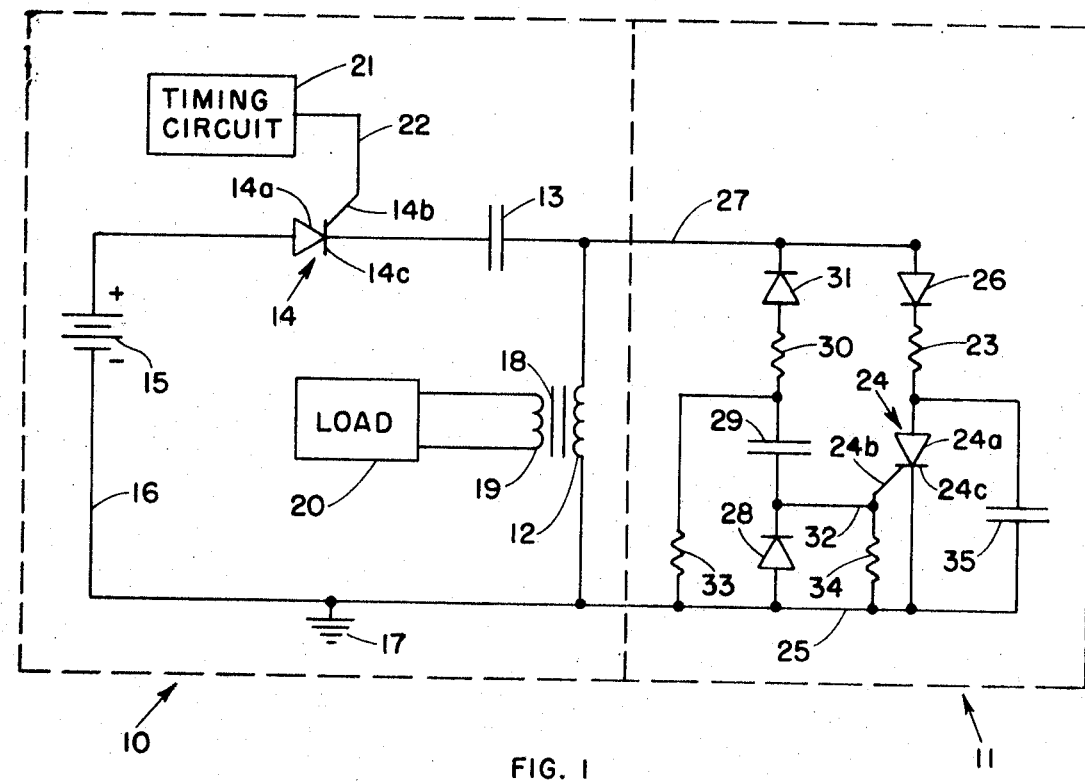
FIG. 1 is a schematic drawing of circuitry embodying the invention.

Referring now to FIG. 1, there is shown a resonant inductor type inverter 10 enclosed in dashed lines and a parasitic oscillation suppressor circuit 11 enclosed in dashed lines. The invertor 10 comprises an inductor 12 which has its upper end, as viewed in the figure, connected through a capacitor 13 to a cathode electrode 14c of a silicon controlled rectifier 14 which serves as a switch means. An anode electrode 14a of the controlled rectifier 14 is connected to the positive side of a DC power source 15. A negative side of the power source 15 is connected via lead 16 to the lower end of the inductor 12, the lead 16 being grounded as at 17. The inductor 12 is carried on a core 18 which may also carry a secondary winding 19 which serves to couple electrical power from the inductor 12 to a load 20.

In order to provide voltage and current through the inductor 12 at a predetermined repetitive rate there is provided for the inverter 10 a timing circuit comprises electrical voltage pulses which transmitted to a gate electrode 14b of the controlled rectifier 14 via a lead 22 to render the controlled rectifier conducting. The timing pulses are of short duration. However, the controlled rectifier 14 continues to conduct after the end of the timing pulse until its current drops below its holding value.

The parasitic oscillation suppressing circuit 11 comprises a damping resistor 23 having its lower end connected to an anode electrode 24a of a controlled rectifier 24 which serves as a switch means for circuit 11. A cathode electrode 24c of the controlled rectifier 24 is connected by means of a lead 25 to the lower end of the inductor 12 thereby providing a complete current path. The upper end of the inductor 12 is connected to an anode electrode of a diode 26 by means of a lead 27, the cathode of diode 26 being connected to the upper end of the damping resistor 23 which serves as a voltage dropping means.

Control circuitry for the switch means 24 is comprised of a diode 28, a capacitor 29, a resistor 30 and a diode 31 connected serially between the leads 25 and 27 as shown in FIG. 1. A point between the diode 28 and the capacitor 29 is connected to a gate electrode 24b of the controlled rectifier 24 through a lead 32 to render the controlled rectifier 24 conducting at the end of each resonant half cycle of the power inverter 12 as will be explained presently. A time constant for the discharge of capacitor 29 is established by a resistor 33 connected in parallel relationship to the serially connected diode 28 and capacitor 29.

To eliminate false triggering of the controlled rectifier 24, a resistor 34 is connected between the gate electrode 24b and the lead 25. The parasitic oscillation suppressing circuit 11 is completed by a capacitor 35 connected between the anode electrode 24a and the cathode electrode 24c of the controlled rectifier 24. The capacitor 35 suppresses voltage spikes which could possibly damage or destroy the controlled rectifier 24.

Operation of the foregoing circuitry will not be described. Referring to FIG. 2A, there is depicted a trigger pulse 36 which is supplied at time $t_1$ to the gate electrode 14b by the timing circuit 21 of FIG. 1. The pulse 36 renders the controlled rectifier 14 conducting causing a voltage pulse as illustrated at 37 in FIG. 2B to appear at the upper end of the inductor 12 with respect to ground 17. When the capacitor 13 becomes fully charged, the voltage across the inductor 12 reverses producing a voltage pulse as shown at 38 in FIG. 2B. At the end of the inductive half cycle which produced voltage pulse 38, spurious oscillations as shown at 39 will be produced because of the rapid turn off of inductor 12. These oscillations, as indicated previously, can destroy solid state components such as the silicon controlled rectifier 14. The current through the inductor during the existence of pulses 37 and 38 is shown at 40 in FIG. 2C. Current oscillations 41 correspond to the parasitic voltage oscillations 39 of FIG. 2B.

The desired voltage waveshape for inductor 12 is shown in FIG. 2D and comprises the voltage pulse 37 produced by current supplied to the inductor while the controlled rectifier 14 is conducting during $t_1$ to $t_2$ and the voltage pulse 39 which occurs during the inductive half cycle $t_2$ to $t_3$. As shown at 42, the voltage across the inductor 12 is permitted to become only slightly positive at the end of the voltage pulse 39 and does not again become negative during the cycle of operation which ends at $t_4$.

Figure 2:
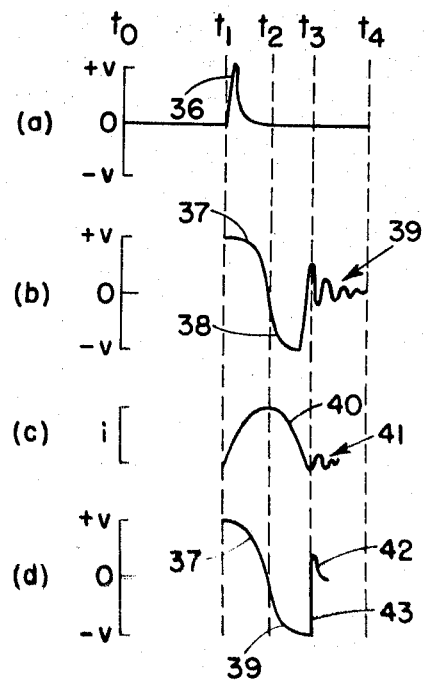
FIG. 2 is a graph at waveshapes which occur in a DC to AC inverter of the resonant inductor type.

During the inductive cycle, the lower end of the inductor 12 is positive with respect to its upper end as shown by the voltage pulse 39 of FIG. 2. Consequently, current flows from the lower end of the inductor 12 through the diode 28 to the lower side of capacitor 29. Current flows from the upper side of capacitor 29 through the resistor 30, the diode 31 and the lead 27 to the upper negative end of inductor 12.

At $t_3$, the end of the inductive cycle, the voltage across the inductor 12 decreases very rapidly towards 0 as indicated at 43 in FIG. 2D. Capacitor 29 immediately discharges into the gate electrode 24B of the controlled rectifier 24 rendering the latter conducting. At this time the upper end of the inductor 12 is beginning to become positive but, because of the conduction of controlled rectifier 24 which effectively connects the damping resistor 23 across inductor 12, only a small positive voltage appears across the inductor as indicated at 42 in FIG. 2D. Thus, the parasitic oscillation which would normally appear across the inductor 12 at the end of the inductive half cycle are critically damped when the damping resistor 23 is connected across the inductor 12 by the conduction of the controlled rectifier 24.

From the foregoing it will be seen that, during the conduction of the controlled rectifier 14, in accordance with the invention, a parasitic oscillation suppression circuit 11 draws no power from the inductor 12 other than a slight current due to the presence of a protective capacitor 35. After the controlled rectifier 14 turns off to begin the inductive half cycle, the only power drawn from the inductor 12 is that resulting by the current required to charge the capacitor 29 of the parasitic oscillation suppression circuit 11. Advantageously, the damping resistor 23 absorbs power from the inductor 12 only when it is desired that parasitic oscillation be critically damped and its insertion in the circuit is accomplished automatically without any external timing circuits.

It will be understood that changes and modifications may be made to the above described circuitry by those skilled in the art without departing from the spirit and scope of the invention as set forth in the claims appended hereto.

What is claimed is:

1. A parasitic oscillation suppressor for use with a power inductor of a resonant type inverter, said suppressor comprising:
    switch means having power electrodes and a control electrode; first voltage dropping means connected serially with said power electrodes of said switch across said power inductor;
    second and third voltage dropping means connected serially between one end of said power inductor and the other end of same;
    first unidirectional conducting means and first energy storage means connected serially in the order mentioned between said one end of said power inductor and a point intermediate said second and third voltage dropping means; and
    means connecting a point intermediate said first unidirectional conducting means and said first energy storage means to said control electrode of said switch means.

2. The circuit of claim 1 wherein said first, second and third voltage dropping means are resistors.

3. The circuit of claim 1 and including a second unidirectional conducting means connected between said third voltage dropping means and said other end of said power inductor and poled to pass current in the same direction as said first unidirectional conducting means.

4. The circuit of claim 3 wherein said switch means is a solid-state controlled rectifier having anode, cathode and gate electrodes.

5. The circuit of claim 4 and including second energy storage means connected between said anode and said cathode of said controlled rectifier, and third unidirectional conducting means connected in series with said first voltage dropping means between said second energy storage means and said other end of said inductor, said third unidirectional conducting means being poled to pass current in the same direction as said SCR.

6. The circuit of claim 5 and including fourth voltage dropping means connected between said gate electrode and said one end of said power inductor.

7. The circuit of claim 5 wherein said first and second energy storage means are capacitors.

8. The circuit of claim 5 wherein said first and second unidirectional conducting means are solid-state diodes.

9. A parasitic oscillation suppressor for use with a power inductor of a resonant type inverter, said suppressor comprising
    switch means having power electrodes and a control electrode; first voltage dropping means connected serially with said power electrodes of said switch across said power inductor;
    a first capacitor connected to said control electrode of said switch means;
    means for charging said capacitor during the inductive half cycle of the power inductor; and
    means for limiting the discharge rate of said capacitor whereby the discharge time of said capacitor is of adequate duration to render said switch means conducting.

* * * * *